US011057844B2

(12) United States Patent
Wilhelmsson et al.

(10) Patent No.: US 11,057,844 B2
(45) Date of Patent: *Jul. 6, 2021

(54) TECHNIQUE FOR PERFORMING CLEAR CHANNEL ASSESSMENTS IN A WIRELESS COMMUNICATION NETWORK

(71) Applicant: Telefonaktiebolaget LM Ericsson (publ), Stockholm (SE)

(72) Inventors: Leif Wilhelmsson, Lund (SE); Guido Roland Hiertz, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/718,433

(22) Filed: Dec. 18, 2019

(65) Prior Publication Data
US 2020/0128490 A1 Apr. 23, 2020

Related U.S. Application Data

(63) Continuation of application No. 15/539,081, filed as application No. PCT/EP2017/064271 on Jun. 12, 2017, now Pat. No. 10,548,091.

(51) Int. Cl.
*H04W 4/00* (2018.01)
*H04W 52/24* (2009.01)
(Continued)

(52) U.S. Cl.
CPC ........ *H04W 52/245* (2013.01); *H04B 17/318* (2015.01); *H04W 52/242* (2013.01);
(Continued)

(58) Field of Classification Search
CPC . H04W 52/245; H04W 52/242; H04W 92/20; H04W 52/146; H04W 84/12
See application file for complete search history.

(56) References Cited

U.S. PATENT DOCUMENTS

2005/0266803 A1 12/2005 Dinur et al.
2013/0017794 A1 1/2013 Kloper et al.
(Continued)

FOREIGN PATENT DOCUMENTS

EP 3091812 A1 11/2016
GB 2539693 A 12/2016
(Continued)

OTHER PUBLICATIONS

Stacey, Robert, "Specification Framework for TGax", IEEE P802.11 Wireless LANs, Doc.:IEEE 802.11-15/0132r15, Mar. 17, 2016, pp. 1-49.

*Primary Examiner* — Abdelnabi O Musa
(74) *Attorney, Agent, or Firm* — Murphy, Bilak & Homiller, PLLC

(57) ABSTRACT

An aspect of the present disclosure is directed to a network node for performing communication in a wireless communication network. The network node is configured to receive a signal transmitted by a user device in the wireless communication network, measure a received power level at which the signal is received by the network node, determine, based on a predefined transmit power level of the network node, based on a predefined transmit power level of the user device and based on the received power level, a threshold power level for a clear channel assessment to be performed by the user device, and trigger transmitting an indication of the threshold power level to the user device. Further aspects of the disclosure pertain to a user device, methods and a computer program product.

13 Claims, 8 Drawing Sheets

(51) Int. Cl.
*H04W 52/36* (2009.01)
*H04B 17/318* (2015.01)
*H04W 72/04* (2009.01)
*H04W 92/20* (2009.01)
*H04W 52/14* (2009.01)
*H04W 74/08* (2009.01)
*H04L 5/00* (2006.01)
*H04W 84/12* (2009.01)

(52) U.S. Cl.
CPC ..... *H04W 52/367* (2013.01); *H04W 72/0473* (2013.01); *H04W 92/20* (2013.01); *H04L 5/0007* (2013.01); *H04W 52/146* (2013.01); *H04W 74/0808* (2013.01); *H04W 84/12* (2013.01)

(56) References Cited

U.S. PATENT DOCUMENTS

| | | | |
|---|---|---|---|
| 2015/0009907 A1* | 1/2015 | Merlin | H04W 74/0808 370/329 |
| 2015/0163824 A1* | 6/2015 | Krzymien | H04W 28/18 370/338 |
| 2015/0373652 A1* | 12/2015 | Dabeer | H04W 52/241 455/522 |
| 2016/0227489 A1* | 8/2016 | Oteri | H04W 52/12 |
| 2017/0332368 A1 | 11/2017 | Einhaus et al. | |
| 2017/0347359 A1 | 11/2017 | Yang et al. | |

FOREIGN PATENT DOCUMENTS

| | | |
|---|---|---|
| JP | 2015534389 A | 11/2015 |
| JP | 2017055312 A | 3/2017 |
| JP | 2017510138 A | 4/2017 |
| JP | 2018518868 A | 7/2018 |
| KR | 20020029428 A | 4/2002 |
| KR | 20160030967 A | 3/2016 |
| KR | 20170020359 A | 2/2017 |
| WO | 0106709 A1 | 1/2001 |
| WO | 2015003053 A1 | 1/2015 |
| WO | 2015200133 A1 | 12/2015 |
| WO | 2016002802 A1 | 1/2016 |
| WO | 2016176550 A1 | 11/2016 |
| WO | 2017036246 A1 | 3/2017 |

* cited by examiner

TECHNIQUE FOR PERFORMING CLEAR CHANNEL ASSESSMENTS IN A WIRELESS COMMUNICATION NETWORK

RELATED APPLICATIONS

This application is a continuation of U.S. application Ser. No. 15/539,081 filed 22 Jun. 2017, which is a U.S. National Phase Application of PCT/EP2017/064271 filed 12 Jun. 2017. The entire contents of each aforementioned application is incorporated herein by reference.

TECHNICAL FIELD

The present disclosure generally relates to a technique for performing communication in a wireless communication network. In particular, methods and devices are disclosed for performing communication in a wireless communication network, which can be, without limitation, a wireless local area network, WLAN, operating in the IEEE 802.11 standard family. More specifically and without limitation, the disclosed devices and methods may be implemented in the context of a clear channel assessment in a channel of the wireless communication network.

BACKGROUND

A commonly used approach for sharing a channel in unlicensed frequency bands (such as the 2.4 GHz frequency band used for wireless communication according to the IEEE 802.11 WLAN standard family) is based on carrier sense multiple access with collision avoidance (CSMA/CA). Effectively, a device that intends to make use of the wireless medium for transmission senses the channel and determines whether the channel is busy (in the following also: "in use", "used" or "occupied") or idle (in the following also: "not in use", "unused" or "unoccupied"). If the channel is determined to be busy, the transmission is deferred whereas if the channel is determined to be idle a transmission is initiated. Just as the name "CSMA/CA" suggests, the idea is to avoid collisions by only initiating a transmission when the channel is not already used by another transmitting device.

In the IEEE 802.11 standard family (which is directed to Wireless Local Area Network, WLAN, communication), initiating a transmission usually requires generating a random back-off value reducing the risk that two devices that find the channel being idle start transmitting at the same time. In practice, other transmission coordination mechanisms may be used too. The details regarding how this initiation of a transmission is implemented are not part of the present disclosure since they are known to the person skilled in the art from the specifications of the respective IEEE 802.11 standard. Therefore, these details are herein not discussed further.

A critical component of the CSMA/CA protocol is how to determine whether the channel is busy ("in use", "used" or "occupied") or idle ("not in use", "unused" or "unoccupied"). There are two fundamentally different ways to determine whether the desired channel is busy or idle. In the first approach, a receiver is searching for a specific (well-defined) signal or "preamble". If found, the wireless medium (channel) is considered to be busy. Additionally, some implementations may consider the channel to be busy only if the signal is above a specific threshold value (a threshold power level). This approach is commonly referred to as signal detect or preamble detect (PD). IEEE 802.11 defines the PD threshold for its OFDM (Orthogonal frequency-division multiplexing) radio designs to be set to −82 dBm or less in the unlicensed 2.4 GHz and 5 GHz bands. That is, if a preamble of an IEEE 802.11 signal is detected at a power level of −82 dBm or higher, the channel must be classified as busy and a device must defer its transmission. On the contrary, if a device detects a well-known signal at a power level below the PD threshold level, the device may classify the channel as idle and may initiate a transmission. Often, however, an IEEE 802.11 STA (station, in the following also: "user device") applies a PD threshold level lower than the required −82 dBm. Specifically, the PD threshold often coincides with the sensitivity threshold for the STA, which may be around −92 dBm. Basically, this means that the user device will defer to any successfully received transmission containing the well-known IEEE 802.11 preamble.

However, sometimes, the channel, in which a transmitter (e.g., a user device) intents to transmit, may be occupied by a signal that, e.g., is generated by a dissimilar system (e.g., not a WLAN device). In this case, it is not sufficient to only use PD in order to determine whether the channel is busy or idle. Therefore, in addition to PD, an IEEE 802.11 receiver sensing the channel also needs to consider the presence of other signals. This is done by detecting the energy level of any signal in the channel. In contrast to PD, this detection is performed independently of the actual type of signal or known preambles. The channel is declared as busy if the energy level exceeds a predefined threshold level and the channel is considered to be unoccupied (idle) otherwise. This way of determining the state of the channel is commonly referred to as energy detect (ED). In IEEE 802.11, the threshold level used for ED is −62 dBm.

As is readily understood, the lower the level that is used for declaring the channel as idle, the less "aggressive" the user device is in accessing the channel. So, comparing the levels for PD and ED, it can be concluded that an IEEE 802.11 system is relatively "nice" to other IEEE 802.11 systems in that it will not initiate a transmission if another IEEE 802.11 transmission at or exceeding −92 dBm (in practice) is detected, whereas if the transmission is caused by another system, the IEEE 802.11 system will instead consider the ED threshold and defer from transmission if the observed energy level exceeds −62 dBm.

To see what this means in terms of range, one may consider some reasonable values for an IEEE 802.11 system. A reasonable transmission (TX) power is 15 dBm. Furthermore, if the system is operated at 2.4 GHz a reasonable model for the propagation loss (PL) in dB is:

$$PL = 40 + 35 \log_{10}(d), \qquad (1)$$

where the first term of 40 corresponds to the attenuation at a distance of 1 m (d=1) and the distance d is given in meters. For another carrier frequency than 2.4 GHz the constant will take another value.

With the typical PD and ED thresholds above, i.e., −92 dBm and −62 dBm, respectively, the corresponding PLs become 107 dB and 77 dB, respectively, for a transmit power of 15 dBm. Finally, using the above formula (1) for PL, it can be readily seen that this corresponds to distances of 82 m and 11 m, respectively.

At the same time, the required signal-to-noise-ration (SNR) for an IEEE 802.11 system using the most robust modulation and coding scheme (MCS) may be around 2 dB, which corresponds to a PL of 107 dB and a range of 82 m at 15 dBm transmit power. In fact, a PD threshold of −92 dBm is representative of the sensitivity level for the lowest (most robust, slowest transmission speed) MCS today's radios are commonly capable of. The number is found as follows. The thermal receiver noise power at room temperature in a 1 MHz bandwidth is −114 dBm, which can be found in books on communication theory and using reasonable assumptions. With a 20 MHz bandwidth, the noise power increases by 13 dB. Finally, we assume a radio implementation specific noise figure in the receiver of 7 dB, leading to a noise floor of −114 "dBm"+13 "dB"+7 "dB"=−94 "dBm". With a required SNR of 2 dB, the sensitivity level of −92 dBm is obtained.

FIG. 1 provides an illustration of the situation described above. The station STA1 1, which is assumed to be located in the center of the small circle 3, would only detect non-Wi-Fi transmissions using ED if the corresponding transmitters would be located within the small circle 3. As calculated above, the small circle 3 is assumed to have a radius of 11 m for the present exemplary consideration. Further, a "coverage area" for an access point (AP) 5 has been calculated above to correspond to 82 m (assuming a sensitivity level of a receiver of −92 dBm). This coverage area is indicated by the large circle 7.

Considering that the access point (AP) 5 is not located within the small circle 3 and that the area of the small circle 3 represents $(11/82)^2 \approx 18/1000$ of the coverage area of the AP 5 it becomes obvious that using ED for detecting WLAN transmission is insufficient. If instead PD is employed, the AP 5 operates within detection range, since it is located within the large circle 9 indicating a PD detection range of STA1 1. Only STAs located in the opposite part of the AP's 5 coverage area cannot be detected under the described PD threshold.

The fact that the channel erroneously might be declared as idle when it in fact is busy is commonly referred to as the hidden node problem due to the fact that the transmitter, which is not heard, is hidden from the STA (STA1) performing the clear channel assessment (CCA). Hidden STA scenarios are susceptible to colliding transmissions. A Request-To-Send/Clear-To-Send (RTS/CTS) message exchange is commonly used counteracting this scenario. When a STA has data to send it senses the channel, and if found idle it transmits an RTS message to the intended receiver. If the intended receiver successfully receives the RTS message it responds with a CTS message indicating a period of time to devices in its surroundings that it requests other devices to defer from medium access attempts.

However, cases may occur, in which a wireless communication system (e.g., a user device) is unable to perform preamble detection PD but can perform energy detection ED. In such a case, the choice of ED power threshold level, below which the wireless medium may be treated as idle, becomes the key parameter for determining performance. In known devices, in IEEE 802.11, the energy detection threshold is set to −62 dBm, as discussed above. As illustrated above, this value is too high for operating with low collision probability. In case a new (additional) IEEE 802.11 operating mode would not be able to rely on PD but solely operate under energy detection rules, radio performance would be detrimentally affected, which is a problem of prior art techniques.

In view of the above, known techniques and communication standards do not sufficiently deal with the aforementioned situation that a wireless device only relies on ED for performing a clear channel assessment.

SUMMARY

Accordingly, there is a need for a technique which solves the above problem or other related problems of prior art techniques. Specifically, and without limitation, there is a need for a technique that may be applied in case a wireless device (e.g., a user device) only relies on energy detect (ED) to perform clear channel assessment (CCA).

According to a first aspect, a network node for performing communication in a wireless communication network is provided. The network node is configured to receive a signal transmitted by a user device in the wireless communication network, measure a received power level at which the signal is received by the network node, determine, based on a predefined transmit power level of the network node, based on a predefined transmit power level of the user device and based on the received power level, a threshold power level for a clear channel assessment to be performed by the user device, and trigger transmitting an indication of the threshold power level to the user device.

According to a second aspect, a network node for performing communication in a wireless communication network is provided. The network node comprises a network interface that is adapted to communicatively couple the network node to the wireless communication network, a processor, and a memory. The memory contains instructions executable by the processor to cause the network node to receive a signal transmitted by a user device in the wireless communication network, measure a received power level at which the signal is received by the network node, determine, based on a predefined transmit power level of the network node, based on a predefined transmit power level of the user device and based on the received power level, a threshold power level for a clear channel assessment to be performed by the user device, and trigger transmitting an indication of the threshold power level to the user device.

According to a third aspect, a network node for performing communication in a wireless communication network is provided. The network node comprises a receiving unit configured to receive a signal transmitted by a user device in the wireless communication network, a measuring unit configured to measure a received power level at which the signal is received by the network node, a determining unit configured to determine, based on a predefined transmit power level of the network node, based on a predefined transmit power level of the user device and based on the received power level, a threshold power level for a clear channel assessment to be performed by the user device, and a triggering unit configured to trigger transmitting an indication of the threshold power level to the user device.

The following description may apply to all aspects described in this disclosure. In particular, the following description concerning the apparatus aspects may not only apply to the apparatus aspects but also to the method aspects described below, where applicable.

Although the following description will be given with reference to a wireless local area network (WLAN), the present application is not limited to a WLAN and the described wireless communication network may be any suitable kind of wireless communication network, including a WLAN according to the standard family IEEE 802.11 (e.g., IEEE 802.11a, g, n, ax or ac; also referred to as Wi-Fi), a Worldwide Interoperability for Microwave Access (WiMAX) according to the standard family IEEE 802.16 and/or a wireless network operating under a 3rd Generation Partnership Project (3GPP) standard, such as LTE or any other mobile communication standard.

The network node may be any wireless device in the wireless communication network. In particular, the network node may be an Access Point (AP) of a WLAN network or a base station, Node B or eNodeB operating under a 3GPP standard. Accordingly, the wireless communication network may be any suitable communication network, including a WLAN or a mobile communication network operating under a 3GPP standard, such as an LTE network. Further, the user device may be any wireless device in the wireless communication network, which is adapted to perform a clear channel assessment in a channel of the wireless communication network. In particular, the user device may be a station (STA) of a WLAN or a User Equipment (UE) of a 3GPP wireless communication network.

The received power level may indicate a measured power level, e.g., in mW, dBm or any other suitable unit. Besides measuring the received power level, the received signal is not necessarily further processed by the network node. The predefined transmit power level of the user device may be a power level (e.g., a standard power level), which is known to the network node. In other words, the predefined transmit power level of the user device may be stored in a memory of the network node and may be retrieved from this memory for determining the threshold power level. The predefined transmit power level of the user device does not necessarily need to correspond to a power level at which the user device is actually transmitting but it may also correspond to a standard value, a mean value, an initial value or any other kind of suitable value. The predefined power level may have been written into a memory of the network node in a configuration step or the value of the predefined power level may have been transmitted to the network node, e.g., from the user device. For example, the predefined transmit power level of the user device may be 15 dBm.

Determining based on one or more parameters may mean, according to the entire present disclosure, that a value is determined as result of a predefined calculation, wherein the one or more parameters are used (i.e., have an influence) in the calculation, e.g., as variables of an equation.

The predefined transmit power level of the network node may be a power level at which the network node is currently transmitting at the time of determining the threshold power level. Additionally or alternatively, the predefined transmit power level of the network node may be a value stored in a memory of the network node. In some embodiments, the predefined transmit power level of the network node may correspond to a standard value or a mean value. For example, the predefined transmit power level of the network node may be 15 dBm.

The threshold power level may be determined based on the following equation:

$$P\_threshold = P\_transmit\_NN / (P\_transmit\_UD / P\_received), \quad (3)$$

where P_threshold is the threshold power level, P_transmit_NN is the predefined transmit power level of the network node, P_transmit_UD is the predefined transmit power level of the user device and P_received is the received power level. In case the power level P_transmit_NN is given in dBm and the power levels P_transmit_UD and P_received are given in dBm, the threshold power level P_threshold in dBm can be calculated as P_threshold (in dBm)=P_transmit_NN (in dBm)−P_transmit_UD (in dBm)+P_received (in dBm). In this disclosure, the threshold power level P_threshold is also referred to as ED_DL, to reflect that it related to the energy that would be detected for a downlink transmission, i.e., a transmission from the AP to the STA.

According to the entire present disclosure, the expression "trigger" may mean that the step following this expression is performed by the device that is configured to trigger the step or by another device, which is in communication with the device configured to trigger the step. For example, the device configured to trigger the step may transmit a trigger message to another device, which performs the step, wherein the trigger message may include further parameters necessary for performing the step.

The indication of the threshold power level may include, e.g., a value of the threshold power level or other data, based on which the threshold power level can be adjusted or set at the user device. For example, the indication of the threshold power level may comprise a number (e.g., 1, 2, 3, etc.), based on which the user device may select a corresponding threshold power level from a look-up table (that may be stored in a memory of the user device).

The network node may further be configured to determine, based on the received power level and based on the predefined transmit power level of the user device, a path loss of the signal transmitted from the user device to the network node. In that case, the network node may be configured to determine the threshold power level based on the predefined transmit power level of the network node and based on the path loss.

The path loss may be determined so as to correspond to the ratio of the predefined transmit power level of the user device and the received power level. In other words, the path loss (PL) may be determined based on the following equation:

$$PL = P\_transmit\_UD / P\_received, \quad (4)$$

where PL is the path loss, P_transmit_UD is the predefined transmit power level of the user device and P_received is the received power level. In case the power levels P_transmit_UD and P_received are given in dBm, the path loss in dB can be calculated as PL (in dB)=P_transmit_UD (in dBm)−P_received (in dBm).

The threshold power level may be determined so as to correspond to the ratio of the predefined transmit power level of the network node and the path loss. In other words, the threshold power level may be determined based on the following equation:

$$P\_threshold = NN / PL, \quad (5)$$

where P_threshold is the threshold power level, P_transmit_NN is the predefined transmit power level of the network node and PL is the path loss. In case the power level P_transmit_NN is given in dBm and the path loss PL is given in dB, the threshold power level P_threshold in dBm can be calculated as P_threshold (in dBm)=P_transmit_NN (in dBm)−PL (in dB). In this disclosure, the threshold power level P_threshold is also referred to as ED_DL, to reflect that it related to the energy that would be detected for a downlink transmission, i.e., a transmission from the AP to the STA.

The network node may further be configured to set a desired maximum received power level for signals to be received by the network node from the user device, determine, based on the maximum received power level and based on the path loss, a maximum transmit power level for signals transmitted by the user device, and trigger transmitting an indication of the maximum transmit power level to the user device.

The desired maximum received power level may be set to a predefined value. The predefined value may be stored, e.g., in a memory of the network node. For example, the desired maximum received power level may correspond to −97 dBm. The desired maximum power level may be set to a value, which does not have a significant impact on the reception of signals received by the network node from another user device.

In view of the above, setting the desired maximum received power level may include one or more calculation steps but it may also relate to a step of considering a predefined, known, power level.

The maximum transmit power level may be determined so as to correspond to the product of the maximum received power level and the path loss. In other words, the maximum transmit power level may be determined based on the following equation:

$$P\_transmit\_max\_UD = P\_received\_max\_NN * PL, \quad (6)$$

where P_transmit_max_UD is the maximum transmit power level for signals transmitted by the user device, P_received_max_NN is the desired maximum received power level for signals to be received by the network node from the user device and PL is the path loss. In case the power level P_received_max_NN is given in dBm and the path loss PL is given in dB, the maximum transmit power level P_transmit_max_UD in dBm can be calculated as P_transmit_max_UD (in dBm)=P_received_max_NN (in dBm)+PL (in dB). In this disclosure, the maximum transmit power level is also referred to as TX_UL.

The indication of the maximum transmit power level may include, e.g., a value of the maximum transmit power level or other data, based on which the maximum transmit power level can be adjusted or set at the user device. For example, the indication of the maximum transmit power level may comprise a number (e.g., 1, 2, 3, etc.), based on which the user device may select a corresponding maximum transmit power level from a look-up table.

The network node may be configured to set the desired maximum received power level for signals to be received by the network node from the user device so as to correspond to a predefined proportion of a thermal noise power level of signals received by the network node.

The thermal noise power level may be a value known to the network node. For example, the thermal noise power level may be a value stored in a memory of the network node. The thermal noise power level may be a thermal noise power level at a bandwidth of 20 MHz. The thermal noise power level may be −94 dBm. The predefined proportion may be given as a value in dB. In other words, the maximum received power level may be determined so as to correspond to the ratio of the thermal noise power level and a predefined value. Since the predefined value may be given in dB, it may also be regarded as an offset value (P_offset). This offset value may be 3 dB. In other words, the maximum received power level may be determined based on the following equation:

$$P\_received\_max\_NN = P\_noise / P\_offset, \quad (7)$$

where P_received_max_NN is the desired maximum received power level for signals to be received by the network node from the user device, P_noise is the thermal noise power level and P_offset defines the predefined proportion. In case the noise power level P_noise is given in dBm and the predefined proportion P_offset is given in dB, the maximum received power level P_received_max_NN in dBm can be calculated as P_received_max_NN (in dBm)= P_noise dBm)−P_offset (in dB).

The network node may further be configured to receive data transmitted from the user device. For example, the network node may be configured to receive the data in a narrow bandwidth channel, such as a channel having a bandwidth of 2 MHz. The communication from the user device to the network node may be referred to as uplink, uplink communication, uplink channel, etc. Communication from the network node to the user device may be referred to as downlink, downlink communication, downlink channel, etc. The data may be received from the network node after the threshold power level has been transmitted to the user device. Further, the data may be transmitted by the user device, after the user device has successfully performed a clear channel assessment in the channel in which the data is transmitted.

The network node may further be configured to transmit signals using an orthogonal frequency-division multiple access, OFDMA, modulation scheme in which one or more resource units, RUs, are assigned for transmissions to and/or from a particular user device. In this case, the network node may further be configured to receive a signal transmitted by the user device, determine, based on the received signal, one or more RUs of the OFDMA modulation scheme used by the network node, in which the received signal is transmitted by the user device, exclude the one or more RUs from a list of RUs available for transmissions from the network node to a further user device, and trigger transmitting data to the further user device by using one or more RUs of the list of RUs.

The OFDMA modulation scheme may, e.g., be an OFDMA modulation scheme of the IEEE 802.11ax standard. The signals transmitted using the OFDMA modulation scheme may be transmitted using one or more resource units (RUs) distributed within a bandwidth of 20 MHz. In that case, an OFDMA modulation scheme for a 20 MHz bandwidth of the IEEE 802.11ax standard may be used.

The signal received from the user device may be a signal transmitted in a narrow band channel, e.g., in a channel having a bandwidth of 2 MHz. Generally speaking, the signal received from the user device may be transmitted in a channel having a bandwidth smaller than the bandwidth used for the OFDMA transmission performed by the network node. A bandwidth of a channel in which the signal is transmitted by the user device may be equal to or smaller than one RU of the OFDMA modulation scheme.

The expression "further user device" according to the present disclosure is merely used to distinguish the "further user device" from the "user device" and has no additional technical meaning. Therefore, alternatively, also the expression "first user device" may be used for the "user device" and the expression "second user device" may be used for the "further user device". Similar considerations hold for the expression "further STA", which could synonymously also be referred to as "second STA".

The step of determining one or more RUs of the OFDMA modulation scheme used by the network node may comprise determining one or more RUs, a frequency bandwidth of which at least partially overlaps a frequency bandwidth of the received signal from the user device. For example, if the bandwidth of the received signal is smaller than one RU, it might be the case that the signal entirely lies within the bandwidth of one RU and in this case, this RU is determined. However, in case the received signal overlaps two or more RUs, these two or more RUs may be determined.

Excluding the one or more RUs may mean that these RUs are not considered in a following selection process for one or more RUs in which data transmission to a further user device is performed using the OFDMA modulation scheme. In other words, the network node will not use the determined one or more RUs for a following data transmission to the further user device.

As stated above, the network node may be configured to transmit signals using an orthogonal frequency-division multiple access, OFDMA, modulation scheme in which one or more resource units, RUs, are assigned for transmissions to and/or from a particular user device. In this case, the network node may further be configured to receive a signal transmitted by the user device, determine, based on the received signal, one or more RUs of the OFDMA modulation scheme used by the network node, in which the received signal is transmitted by the user device, exclude the one or more RUs from a list of RUs available for transmissions from a further user device to the network node, and trigger scheduling a transmission from the further user device to the network node by using one or more RUs of the list of RUs.

Regarding the OFDMA modulation scheme and regarding the steps of receiving and determining, the same aspects as discussed above may also be valid in this case. Further, regarding the step of excluding, similar considerations with regard to the aforementioned step of excluding may apply.

Excluding the one or more RUs may mean that these RUs are not considered in a following selection process for one or more RUs in which data transmission from a further user device to the network node is scheduled, wherein the scheduled data transmission is performed using the OFDMA modulation scheme. The scheduling is triggered (and/or performed) by the network node. In other words, the network node will not use the determined one or more RUs for a following scheduling of data transmission from the further user device to the network node.

The network node may be configured such that the step of triggering scheduling the transmission from the further user device to the network node comprises transmitting a scheduling message to the further user device, wherein the scheduling message comprises an indication of the one or more RUs of the list of RUs to be used by the further user device for the transmission from the further user device to the network node.

In that way, the network node can assign one or more RUs to an uplink communication of data transmitted from the further user device to the network node. The network node can thereby maintain an overview of the individual communications (in particular, the OFDMA communications) performed in the wireless network. For example, the network node can assign other RUs to an uplink communication of data transmission from a 2nd further user device to the network node. These other RUs may also not include the previously mentioned excluded one or more RUs.

The wireless communication network may be a wireless local area network, WLAN, operating in the IEEE 802.11 standard family and the network node may comprise an access point of the WLAN. The access point may be an access point (AP) of the WLAN according to the used IEEE 802.11 standard.

The wireless communication network may be a wireless local area network, WLAN, operating in the IEEE 802.11 standard family and the user device may comprise a station, STA, of the WLAN. The station may be a station (STA) of the WLAN according to the used IEEE 802.11 standard.

The network node may be configured to communicate with a first type of user device and a second type of user device, wherein the second type of user device supports wider bandwidths than the first type of user device.

In other words, the network node may be configured to communicate with the first type of user device using a first bandwidth and with a second type of user device using a second bandwidth, wherein the first bandwidth is narrower than the second bandwidth. Within this disclosure, the first bandwidth will also be referred to as a narrow bandwidth (NB) and the second bandwidth will also be referred to as a wide bandwidth. For example, the narrow bandwidth may refer to a bandwidth of 2 MHz. Further, the wide bandwidth may refer to a bandwidth of 20 MHz.

The first type of user device may, for example, only support communication within a bandwidth of 2 MHz or less.

The second type of user device may support, for example, communication within a bandwidth of 10 MHz or more (e.g., 20 MHz).

According to a fourth aspect, a user device for performing communication in a wireless communication network is provided. The user device is configured to receive, from a network node of the wireless communication network, a threshold power level for a clear channel assessment to be performed by the user device in the wireless communication network, receive, from the network node, a maximum transmit power level for signals transmitted by the user device, trigger performing the clear channel assessment in a channel of the wireless communication network, and, in case the channel is determined to be idle, transmit data to the network node in the wireless communication network at a transmit power level equal to or lower than the maximum transmit power level.

According to a fifth aspect, a user device for performing communication in a wireless communication network is provided. The user device comprises a network interface that is adapted to communicatively couple the user device to the wireless communication network, a processor, and a memory. The memory contains instructions executable by the processor to cause the user device to receive, from a network node of the wireless communication network, a threshold power level for a clear channel assessment to be performed by the user device in the wireless communication network, receive, from the network node, a maximum transmit power level for signals transmitted by the user device, trigger performing the clear channel assessment in a channel of the wireless communication network, and, in case the channel is determined to be idle, transmit data to the network node in the wireless communication network at a transmit power level equal to or lower than the maximum transmit power level.

According to a sixth aspect, a user device for performing communication in a wireless communication network is provided. The user device comprises a first receiving unit configured to receive, from a network node of the wireless communication network, a threshold power level for a clear channel assessment to be performed by the user device in the wireless communication network, a second receiving unit configured to receive, from the network node, a maximum transmit power level for signals transmitted by the user device, a triggering unit configured to trigger performing the clear channel assessment in a channel of the wireless communication network, and a transmitting unit configured to, in case the channel is determined to be idle, transmit data to the network node in the wireless communication network at a transmit power level equal to or lower than the maximum transmit power level.

The user device of any of the fourth to sixth aspect may correspond to the user device from which the network node of any of the first to third aspect receives a signal. The details described above with regard to details of the network node of the first to third aspect may apply accordingly to the user device of the fourth to sixth aspect.

According to a seventh aspect, a method for performing communication in a wireless communication network is provided. The method is performed by a network node and the method comprises receiving a signal transmitted by a user device in the wireless communication network, measuring a received power level at which the signal is received by the network node, determining, based on a predefined transmit power level of the network node, based on a predefined transmit power level of the user device and based on the received power level, a threshold power level for a clear channel assessment to be performed by the user device, and triggering transmitting an indication of the threshold power level to the user device.

The method of the seventh aspect may be performed by a device of any of the first to third aspect.

The details of the network node of the first to third aspect may also apply to the method of the seventh aspect in a sense that the network node is configured to perform the method of the seventh aspect. In other words, the method of the seventh aspect may comprise steps corresponding to the aforementioned device features of the first to third aspect.

According to an eighth aspect, a method for performing communication in a wireless communication network is provided. The method is performed by a user device and the method comprises receiving, from a network node of the wireless communication network, a threshold power level for a clear channel assessment to be performed by the user device in the wireless communication network, receiving, from the network node, a maximum transmit power level for signals transmitted by the user device, triggering performing the clear channel assessment in a channel of the wireless communication network, and, in case the channel is determined to be idle, transmitting data to the network node in the wireless communication network at a transmit power level equal to or lower than the maximum transmit power level.

The method of the eighth aspect may be performed by a device of any of the fourth to sixth aspect.

The details of the user device of the fourth to sixth aspect may also apply to the method of the eighth aspect in a sense that the user device is configured to perform the method of the eighth aspect. In other words, the method of the eighth aspect may comprise steps corresponding to the aforementioned device features of the fourth to sixth aspect, and, if applicable, of the first to third aspect.

According to a ninth aspect, a computer program product is provided. The computer program product comprises program code portions to perform the steps of any of the methods described in this disclosure when the computer program product is executed on one or more processing devices. The processing device may be or may comprise, e.g., a network node or a user device according to the present disclosure.

The computer program product of the ninth aspect may be stored on one or more computer-readable recording media, such as, e.g., optical recording media, magnetic recording media, solid state recording media, etc.

BRIEF DESCRIPTION OF THE DRAWINGS

Further details of embodiments of the technique are described with reference to the enclosed drawings, wherein.

DETAILED DESCRIPTION

Figure 1:
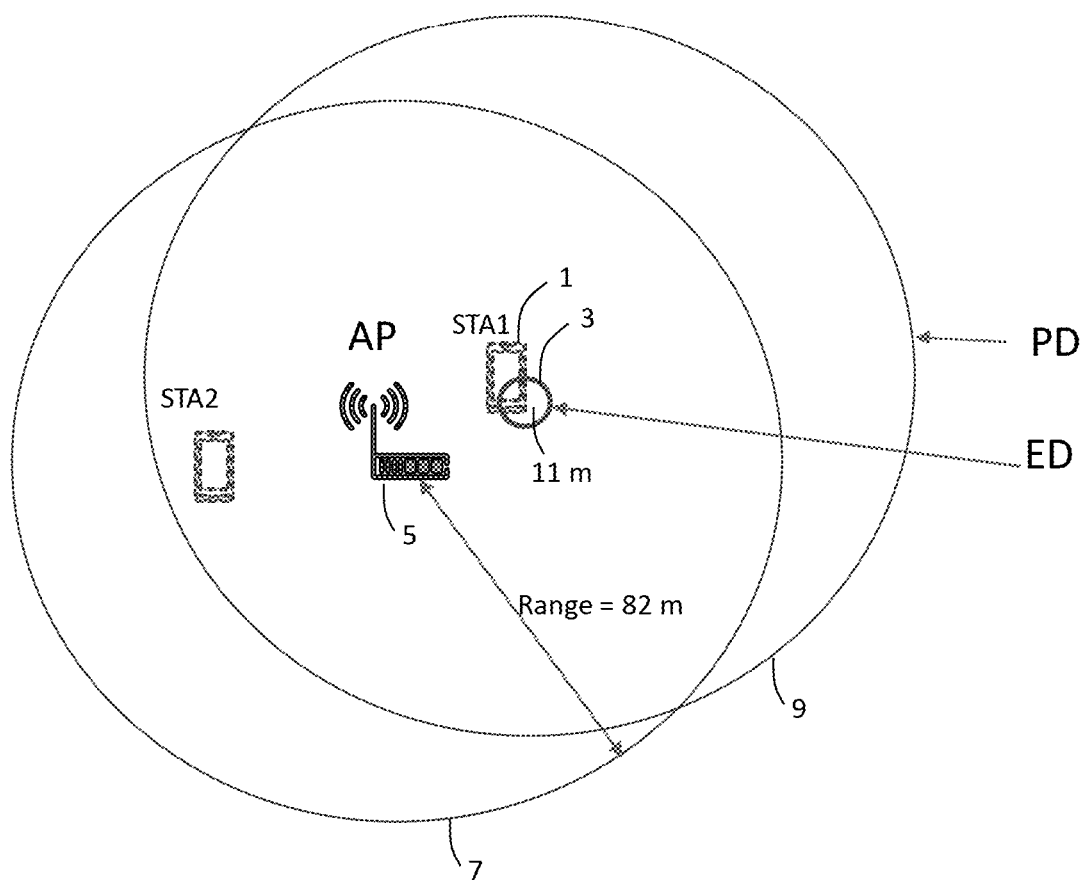
FIG. 1 shows an illustration of energy detect (ED) and preamble detect (PD) performed by a station (STA1) in a WLAN.

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for Wireless Local Area Network (WLAN) and the IEEE 802.11 standard family (e.g., IEEE 802.11a, g, n, ax or ac; also referred to as WLAN or Wi-Fi), it is readily apparent that the technique described herein may also be implemented in many other wireless communication networks, which are based on Carrier Sense Multiple Access/Collision Avoidance (CSMA/CD). Such communication networks may include a 3G, 4G or 5G wireless communication network operating under a 3GPP standard, such as Long Term Evolution (LTE) and/or a Worldwide Interoperability for Microwave Access (WiMAX) according to the standard family IEEE 802.16.

Moreover, those skilled in the art will appreciate that the services, functions, steps and units explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the embodiments may also be embodied in a computer program product as well as in a system comprising a computer processor and memory coupled to the processor, wherein the memory is encoded with one or more programs that may perform the services, functions, steps and implement the units disclosed herein.

Further, in the following, specific devices (in particular a network node and a user device) are described, which perform or are configured to perform certain steps of a method. However, it will be appreciated by those skilled in the art, that those steps do not necessarily have to be performed by one single device but may be performed by different devices that are communicatively coupled with each other. For example, more than one device may be provided and/or more than one processor may be provided, wherein the steps are distributed among the devices and/or processors. Further, a cloud computing environment may be used for performing the steps of one or more of the methods described herein.

According to the present disclosure and without limitation, it is proposed to adapt an energy detect (ED) threshold used by a station (STA) based on the channel conditions. Furthermore, it is proposed that a suitable threshold level may be determined by the access point (AP) and communicated to the associated STA. The threshold may be determined based on downlink (DL) conditions, and may be selected such that the probability of channel use is maximized under the constraint that the threshold will prevent or limit collisions with ongoing transmissions. In addition, the AP may determine the maximum transmit power to be used. In this way transmissions form STAs can be avoided using ED only to degrade performance of the legacy system.

Generally speaking and without limitation, the present disclosure may be implemented in a WLAN environment, in which one access point (AP) is in wireless communication with a plurality of stations (STAs). At least one of the STAs may be a legacy STA (or wideband STA) which is configured to communicate with the AP in a wideband channel having a wide bandwidth of, e.g., 20 MHz. Further, at least one of the STAs may be a STA (narrowband STA, NB-STA, or NB-Wi-Fi STA) which is configured to communicate with the AP in a narrowband channel having a narrow bandwidth of, e.g., 2 MHz. In that constellation, it may be the case that the NB-STA is only configured to operate in the narrowband channel and is not able to detect preambles transmitted by the wideband STA. Therefore, the NB-STA may not be able to perform PD and has to rely on ED for using a clear channel assessment in case the NB-STA intents to transmit data to the AP (e.g., when no data transmission has been scheduled by the AP).

To ease the description of the present disclosure, specific system parameters are used. However, as should be obvious for anyone of ordinary skill in the art, the disclosure is not limited to these choices of parameters. Also, the terminology used is that commonly used in IEEE 802.11. E.g., the term access point (AP) is used when referring to the network node. However, equivalent terms for instance are base station, node B (NB), or evolved node B (eNB). Similarly, the term Station (STA) is used when referring to a non-network node. Equivalent terms are user equipment (UE), user device, device, etc.

Suppose that an AP supports two different types of STAs, one able to transmit and receive high data rates at a wide bandwidth (a wideband STA), the other limited to transmit and receive at lower data rates using a narrow bandwidth (a narrowband STA). To be more specific, an example of the former STA (wideband STA) would be one compliant with 802.11 a, b, g, n, ac, or ax, able to transmit and receive signals of 20 MHz or potentially more, e.g. 40 MHz, 80 MHz, or even 160 MHz.

All wideband packets sent by STAs compliant with any of the aforementioned standards contain a preamble. Specifically, this preamble, henceforth referred to as a legacy preamble, is used by all versions as means to ensure backward compatible signal (transmission) detection. Hence legacy equipment may perform PD for packets whose actual data may be transmitted in a format not decodable by the same legacy device.

This backward compatibility approach comes at the cost of additional overhead. However, it is a simple and robust mechanism. Inherently this approach requires future generations of the standard also to support the older versions of the standard. In the past, when evolving standards has been in the direction of increasing the supported data rate, this becomes natural and essentially comes at no additional cost since the old version of the standard often can be seen as a subset of the newer version. However, when a newer version of a standard instead targets lower power consumption and lower cost, also supporting legacy operation could completely ruin the possibility to achieve these goals. As a very obvious example, if the legacy signal is 20 MHz wide, and the new version of the standard targets to achieve low power consumption and low cost by reducing the bandwidth a factor of 10, to 2 MHz, also supporting 20 MHz reception does not make sense.

Thus, as the legacy preamble is sent over 20 MHz, it cannot be decoded by a STA (NB-STA) only supporting 2 MHz bandwidth. Thus, the only option that remains for a NB-Wi-Fi STA is to rely on ED in case it has to determine whether the channel is idle or busy. As discussed above, performing ED with the default parameters will almost never work as the probability that another STA is sufficiently close for the channel to be declared as busy is very small, and thus the channel will likely be erroneously declared as idle and potentially cause a collision. In the present disclosure this problem is addressed.

A goal is that a NB-STA should be able to perform ED, and based on this determine whether it is allowed to transmit or not. And if it is allowed to transmit, this may also be under a constraint of a limited transmission power.

To ensure that no harm to an ongoing transmission is done, potential DL and UL transmissions (between AP and a further STA, e.g., a wideband STA) are considered separately.

DL (downlink; transmission from AP to a further STA): If the transmission is in the DL, i.e., from the AP to the further STA, the AP can accurate estimate at what level a NB-STA will receive the signal. This power level is denoted as ED_DL, to reflect that this is the threshold level that would be appropriate to use for the NB-STA in order to determine whether a DL transmission is ongoing. ED_DL is also referred to as P_threshold herein.

UL (uplink; transmission from a further STA to AP): If the transmission is in the UL, i.e., from the further STA to the AP, the power received at the NB-STA will depend on which one of the STAs is transmitting in the UL. This can vary considerably, and in particular it could be so that the STA simply cannot be heard at all. To allow the NB-STA to access the channel, still ensuring that no harm is made, the AP uses a different approach. In case of an UL transmission, on the other hand, the AP knows roughly what the received power will be from the different STAs potentially transmitting in the UL. As the AP also approximately knows the path-loss between the NB-Wi-Fi STA and the AP, it can determine at what power the NB-STA can transmit without significantly degrading an UL transmission from another STA. This maximum allowed TX power is denoted as TX_UL, to reflect that this is a limit related to the transmit power for the UL. TX_UL is also referred to as P_transmit_max_UD.

So, by use of the ED_DL it is ensured that a DL transmission is not ruined as it is ensured that a NB-Wi-Fi STA will not initiate a transmission. However, for the UL, the way it is ensured that no harm is caused, is by potentially limiting the TX power of the NB-STA.

Thus, for the UL no attempt is made to avoid collisions, instead what is guaranteed is that if a NB-Wi-Fi transmission is made at the same time as a wideband system, the NB-Wi-Fi signal is sufficiently weak so that the wideband system will still work. The NB-Wi-Fi signal may not be correctly received, but this just has the effect that the NB-Wi-Fi STA has to make a new attempt, just as it is usually done in a contention based system when a packet is not acknowledged.

According to some embodiments, the AP determines an ED_DL value, a TX_UL value and communicates these two values to a NB-Wi-Fi STA. The NB-Wi-Fi STA then uses these values to determine if it can access the channel, and if it can access the channel what transmission power can be used. Note that both ED_DL and TX_UL may be largely different for different NB-Wi-Fi STAs depending on their relative location to the AP. In some embodiments, however, only the ED_DL is determined and communicated to a NB-STA and no TX_UL value is determined and communicated.

Figure 2:
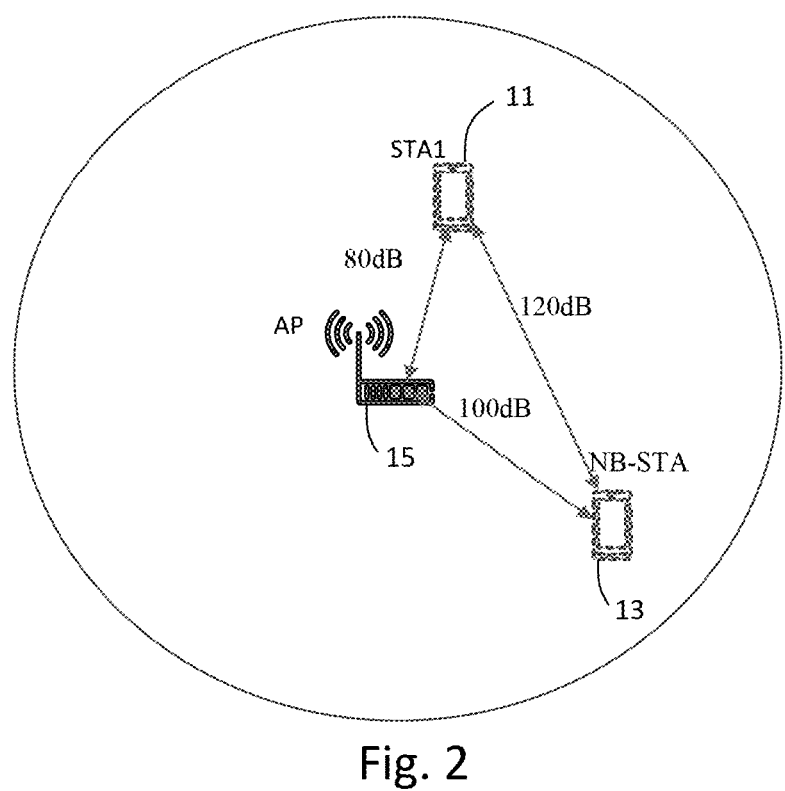
FIG. 2 shows an example of an arrangement based on which the technique of the present disclosure is illustrated.

To give a numerical example of the embodiments described above, according to which an ED_DL value and a TX_UL value are determined and transmitted, FIG. 2 is considered. FIG. 2 shows an example of a simple deployment with one legacy STA (STA1) 11 and one NB-Wi-Fi STA (NB-STA) 13 connected to the AP 15.

As shown in FIG. 2, according to the example, a path loss between AP 15 and STA1 11 is 80 dB, a path loss between AP 15 and NB-STA 13 is 100 dB and a path loss between STA1 11 and NB-STA 13 is 120 dB.

In the following, to illustrate the problem of the prior art, it will be briefly described what would happen in case prior art ED was applied to the arrangement of FIG. 2. If ED would be employed according to prior art, using the same levels as are currently used in IEEE 802.11, the ED level measured in a 2 MHz bandwidth would be −72 dBm (10 dB lower than the −62 dBm measured in a 20 MHz channel). Clearly, if the NB-Wi-Fi STA 13 would use this ED threshold, the channel would always be found being idle as the receiver power in 2 MHz in case of DL transmission would be −95 dBm and in case of UL transmission would be −115 dBm. It is here assumed that the transmission power used by both the AP 15 and STA1 11 is 15 dB.

Considering what will happen if the NB-Wi-Fi STA 13 initiates a transmission when a DL communication is ongoing, it is readily seen that the AP 15 will not be able to receive it as it is currently transmitting. Considering an UL transmission, the received power at the AP 15 will be −85 dBm within a 2 MHz channel. At the same time the received power from STA1 11 will be −65 dBm. However, the thermal noise in the AP 15 in a 20 MHz channel will be in the order of −114 dBm/MHz+13 dBMHz+7 dB=−94 dBm, where −114 dBm/MHz is the thermal noise power within a 1 MHz channel, 13 dBMHz comes from the consideration that a 20 MHz channel will have 13 dB more noise than a 1 MHz channel, and 7 dB is assumed to be the noise figure of the receiver.

Thus, without interference from the NB-Wi-Fi transmission the signal-to-noise-ratio (SNR) is −65−(−94)=29 dB. However, NB-Wi-Fi interference present, the signal-to-interference-ratio (SIR) becomes −64−(−85)=21 dB. Thus, if noise and interference is treated as having the same effect on the desired signal, the signal quality of the signal received from STA1 11 is degraded by 8 dB. Assuming that the modulation and coding (MCS) used for transmission from STA1 11 to the AP 15 is adapted to the channel conditions of 29 dB SNR, reception would almost certainly fail if the signal quality drops to around 21 dB, clearly illustrating the problem with using ED for determining whether the channel is idle or busy.

Now, according to the present embodiment the AP 15 estimates ED_DL. Since the AP 15 knows the TX power used by the NB-Wi-Fi STA 13 and corresponding power is this easily done. In this particular example the transmitted power was 15 dBm, the received power −85 dBm, and consequently path loss is 100 dB. In this particular case the transmit powers were the same for the AP 15 and the NB-Wi-Fi 13, which results in that ED_DL becomes the same as the received power at the AP 15, i.e., −85 dBm. Thus, the NB-Wi-Fi STA 13 should perform ED with ED_DL=−85 dBm.

Next, it is considered what is required in order to not significantly degrade the performance for an UL transmission from STA1 11 to the AP 15. According to the calculations above, the thermal noise power is −94 dBm in a 20 MHz bandwidth. Suppose it is required that the power of the NB-Wi-Fi transmission when received at the AP 15 should be at least 3 dB lower in order to not have a significant impact, i.e., the maximum power received from the NB-Wi-Fi STA 13 should not exceed −97 dBm. Since the path loss is 100 dB, it follows that the maximum output power that is allowed for the NB-Wi-Fi STA 13 is 3 dBm. So the AP 15 sends this information to the NB-Wi-Fi STA 13, i.e., that in order to access the channel it must use ED with a threshold of −85 dBm. In case the channel is found to be idle, the NB-Wi-Fi STA 13 may transmit but not using a TX power exceeding 3 dBm.

Reducing the power of the NB-Wi-Fi signal in order not to cause interference to an ongoing UL transmission can of course only be done to a certain point if the AP 15 should still be able to receive the NB-Wi-Fi signal. What is worth noting is the SNR of the NB-Wi-Fi signal at the AP 15 will benefit from that the bandwidth is much smaller. So, although the received power of the NB-Wi-Fi signal should not exceed −97 dBm, the SNR within a 2 MHz channel becomes 7 dB since the noise power within a 2 MHz channel becomes −104 dBm still assuming a 7 dB noise figure. A SNR of 7 dB would typically allow for successful reception of a NB-Wi-Fi signal at the AP 15.

Figure 3:
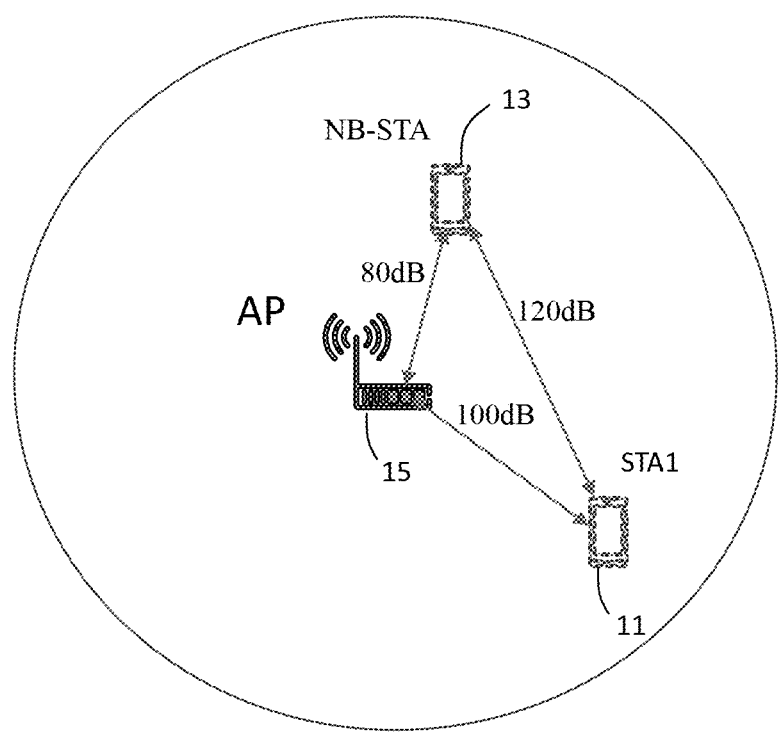
FIG. 3 shows a further example of an arrangement based on which the technique of the present disclosure is illustrated.

To provide another example, FIG. 3 is considered, which is similar to FIG. 2 but with STA1 11 and the NB-Wi-Fi STA 13 swapped with regard to their position. In other words, according to the example discussed with regard to FIG. 3, a path loss between AP 15 and STA1 11 is 100 dB, a path loss between AP 15 and NB-STA 13 is 80 dB and a path loss between STA1 11 and NB-STA 13 is 120 dB.

Redoing the calculations similar to the example of FIG. 2, ED_DL=−65 dBm is obtained. Furthermore, the UL signal from STA1 11 will be received at −85 dBm. The thermal noise in the AP 15 remains as above, i.e., −94 dBm in a 20 MHz channel, so that the SNR for a 20 MHz wide UL transmission becomes −85 dBm−(−94 dBm)=9 dB. Again, requiring that the NB-Wi-Fi signal should be 3 dB below the noise floor, i.e., received at −97 dBm, it follows that the maximum transmit power for the NB-Wi-Fi STA 13 becomes −97 dBm+80 dB=−17 dBm.

Consequently, the NB-STA 13 would use ED_DL=−65 dBm to determine whether the channel should be considered idle, and if found idle the NB-Wi-Fi STA 13 would be allowed to use a maximum TX power of −17 dBm.

In the embodiments above the transmissions to and from legacy STAs 11 were assumed to be 20 MHz, whereas the NB-Wi-Fi transmission was assumed to be only 2 MHz. In case the legacy transmission is based on OFDMA, such as e.g. IEEE 802.11ax, a slightly modified approach is possible. This will be described in the following embodiment.

Figure 4:
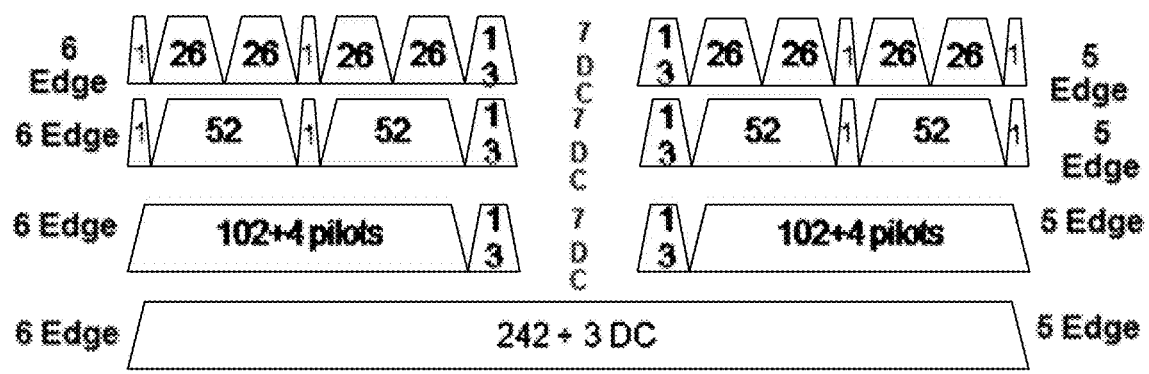
FIG. 4 shows resource units (RUs) used for a 20 MHz channel in IEEE 802.11ax.

It is supposed that OFDMA is used, and by means of example IEEE 802.11ax is considered. For example, the OFDMA communication may be used between the AP 15 and the STA1 11 (legacy station or wideband STA) shown in FIG. 2 or FIG. 3 described above. FIG. 4 shows an illustration of possible resource units (RUs) for a 20 MHz channel in IEEE 802.11ax. In 802.11ax, up to 9 RUs can be supported in a 20 MHz channel as illustrated in FIG. 4. For further details, it is hereby referred to IEEE P802.11 Wireless LANs, "Specification Framework for TGax", doc.:IEEE 802.11-15/0132r8, September 2015, which is hereby incorporated by reference in its entirety.

The AP 15 can improve the chances for a NB-Wi-Fi STA 13 to gain access to the channel, and also allow for an increased TX power by not using the RU which is used by the NB-Wi-Fi STA 13 in the DL transmission and in addition not schedule any UL transmission on the corresponding RU.

Suppose, as an example, that that the NB-Wi-Fi STA 13 is using the RU at the lowest frequency, i.e., the left most RU with 26 sub-carriers in FIG. 4. Furthermore, again a deployment as the one described in FIG. 2 is assumed. Since now there is no transmitted signal in the corresponding 2 MHz, the detected energy will be considerably less in case of a DL transmission. The energy will not be identically zero as there is some leakage in the IFFT used to generate the signal for the adjacent RU, but it will be, e.g., 30 dB smaller than if the RU would be allocated for user data transmission. The ED_DL is kept the same, i.e. −85 dBm. This means that the NB-Wi-Fi STA 13 will find the channel being idle as the received power within a RU not used for data is very small as described above. So by using OFDMA, and intentionally not allocating data for a specific RU, NB-Wi-Fi STAs using this RU will basically obtain a clear channel to access.

Further, there may also be a constraint on the allowed transmit power that can be used by the NB-Wi-Fi STA 13. In the first embodiment, this constraint was based on that it should not degrade a wideband transmission in the UL, but the fact that the NB-Wi-Fi signal would not be received by the AP was simply accepted. In case of OFDMA, the AP can also explore this when scheduling the UL by not allocating any other data to the corresponding RU. In the deployment described in FIG. 2, it was declared in the earlier embodiment that the TX power should be reduced to 3 dB so that the received power in a 2 MHz channel became −97 dBm. However, since the received power from STA1 11 in the same 2 MHz channel was −75 dBm, the SIR viewed from the NB-Wi-Fi STA 13 point of view becomes −22 dB, which will make reception of the NB-Wi-Fi signal impossible. Therefore, according to the present embodiment OFDMA is used and the corresponding RU is not allocated for the UL. Now, since the power from the wideband system within this RU now only is caused by some leakage from adjacent RUs, the SIR can be expected to be around 30 dB better than if the RU would be allocated for UL data transmission. Thus, a SIR of around 8 dB would be obtained, and also the NB-Wi-Fi signal would be easily decodable by the AP 15.

Just as for the first embodiment, the ED_DL as well as the allowed TX power are parameters that are derived for the individual STAs. It is, of course, possible to look at the requirements for all involved STAs, and then decide to use the most restrictive requirements for all STAs in case it would be seen as too complicated to keep track of a large set of requirements.

Any of the embodiments described below may be carried out in the context of one or more of the technologies and embodiments described above. In particular, the embodiments described below may be implemented in a WLAN communication network.

Figure 5:
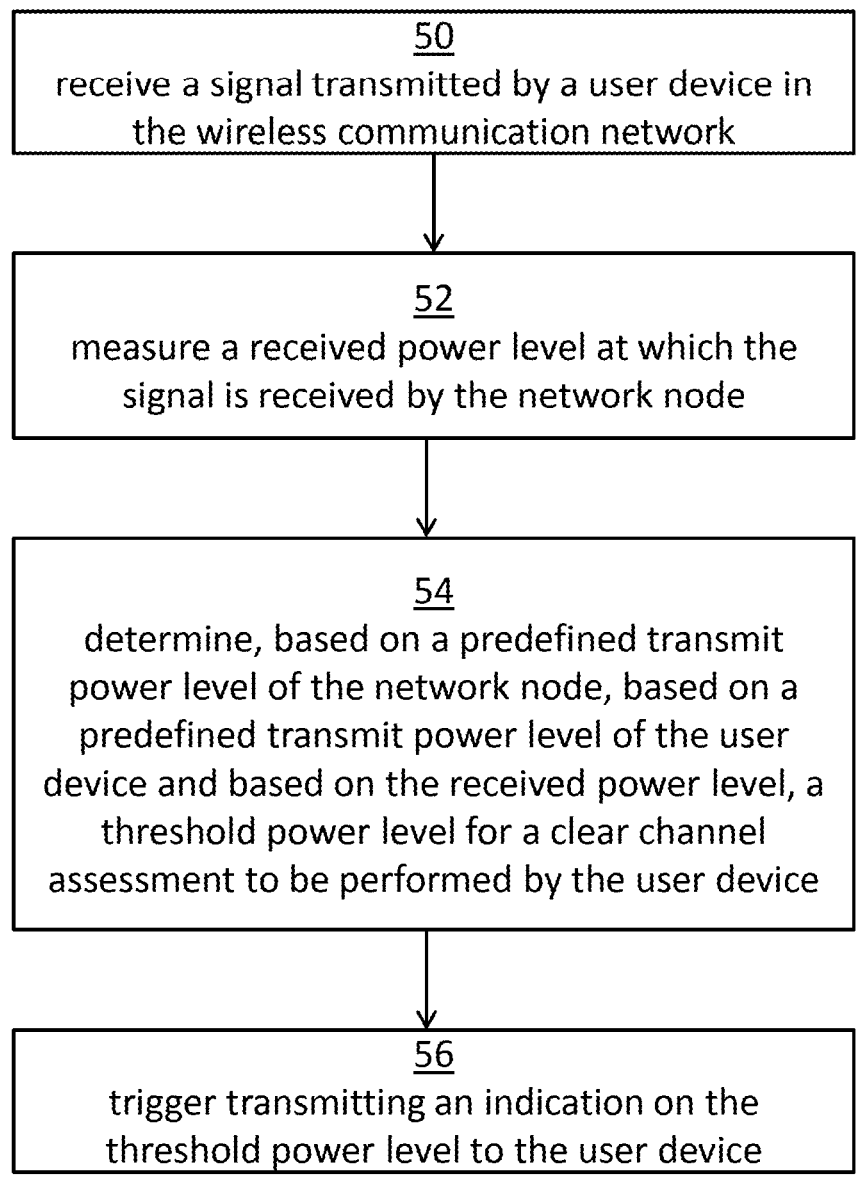
FIG. 5 shows a flowchart of a method for performing communication in a wireless communication network performed by a network node, according to the present disclosure.

FIG. 5 shows a flowchart of a method for performing communication in a wireless communication network. The method may be implemented by any of the network nodes described in this disclosure. In particular, the method shown in FIG. 5 may be performed by the AP 15 shown in FIG. 2 or 3.

As shown in FIG. 5, the method comprises the following steps:

Receiving 50 a signal transmitted by a user device in the wireless communication network.

Measuring 52 a received power level at which the signal is received by the network node.

Determining 54, based on a predefined transmit power level of the network node, based on a predefined transmit power level of the user device and based on the received power level, a threshold power level for a clear channel assessment to be performed by the user device.

Triggering 56 transmitting an indication of the threshold power level to the user device.

Figure 6:
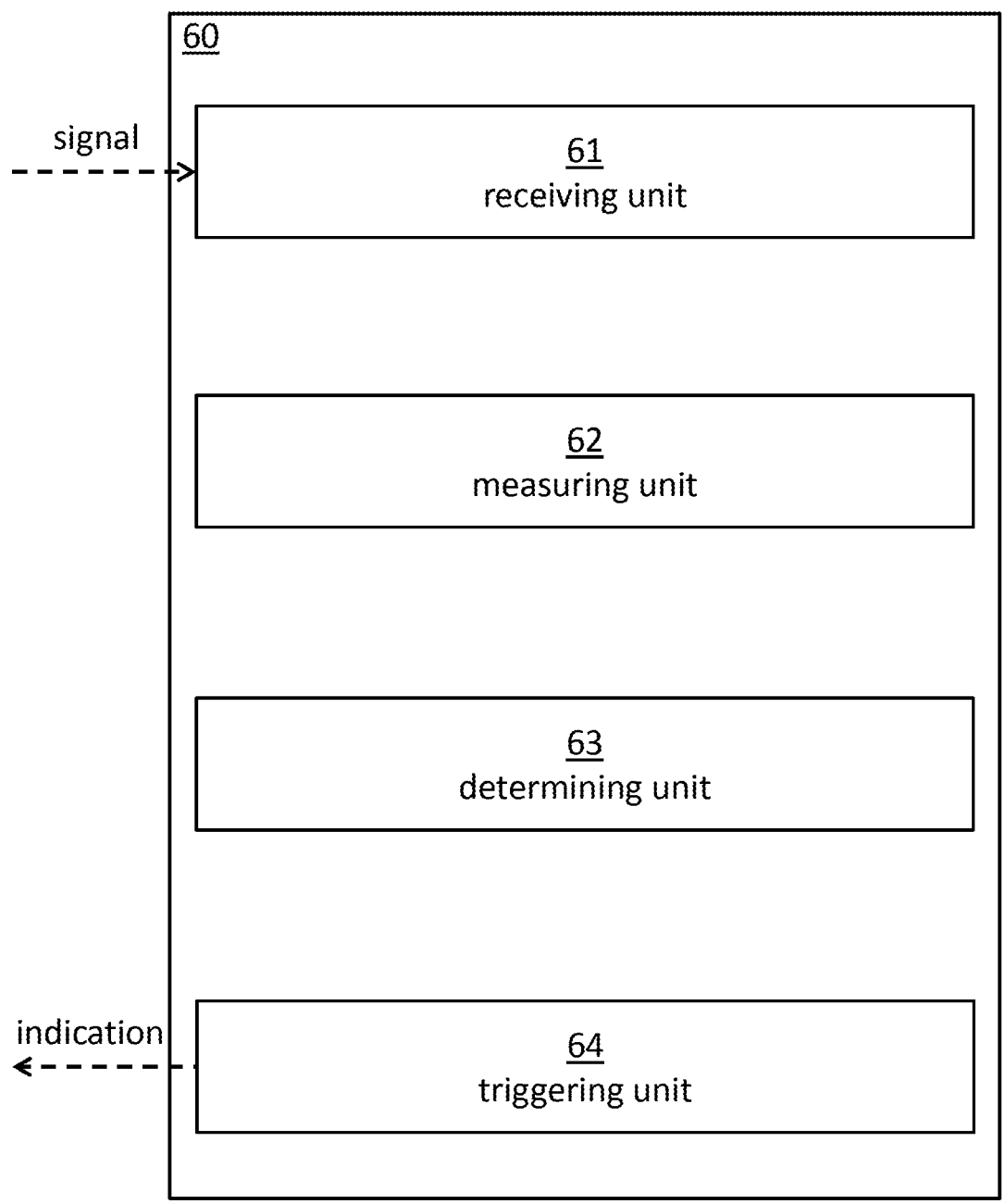
FIG. 6 shows a schematic representation of a network node for performing communication in a wireless communication network, according to the present disclosure.

FIG. 6 shows a schematic block diagram of a network node 60 configured to perform the method described above with reference to FIG. 5. The network node 60 may be an AP described in the present disclosure. For example, the network node 60 may correspond to the AP 15 described with regard to FIG. 2 or 3.

As shown in FIG. 6, the network node 60 comprises:

A receiving unit 61 configured to receive a signal transmitted by a user device in the wireless communication network.

A measuring unit 62 configured to measure a received power level at which the signal is received by the network node.

A determining unit 63 configured to determine, based on a predefined transmit power level of the network node, based on a predefined transmit power level of the user device and based on the received power level, a threshold power level for a clear channel assessment to be performed by the user device.

A triggering unit 64 configured to trigger transmitting an indication of the threshold power level to the user device.

The details described above with regard to the embodiments discussed with reference to FIGS. 1 and 2 may also be applied with regard to the method of FIG. 5 and with regard to the network node 60 of FIG. 6.

Figure 7:
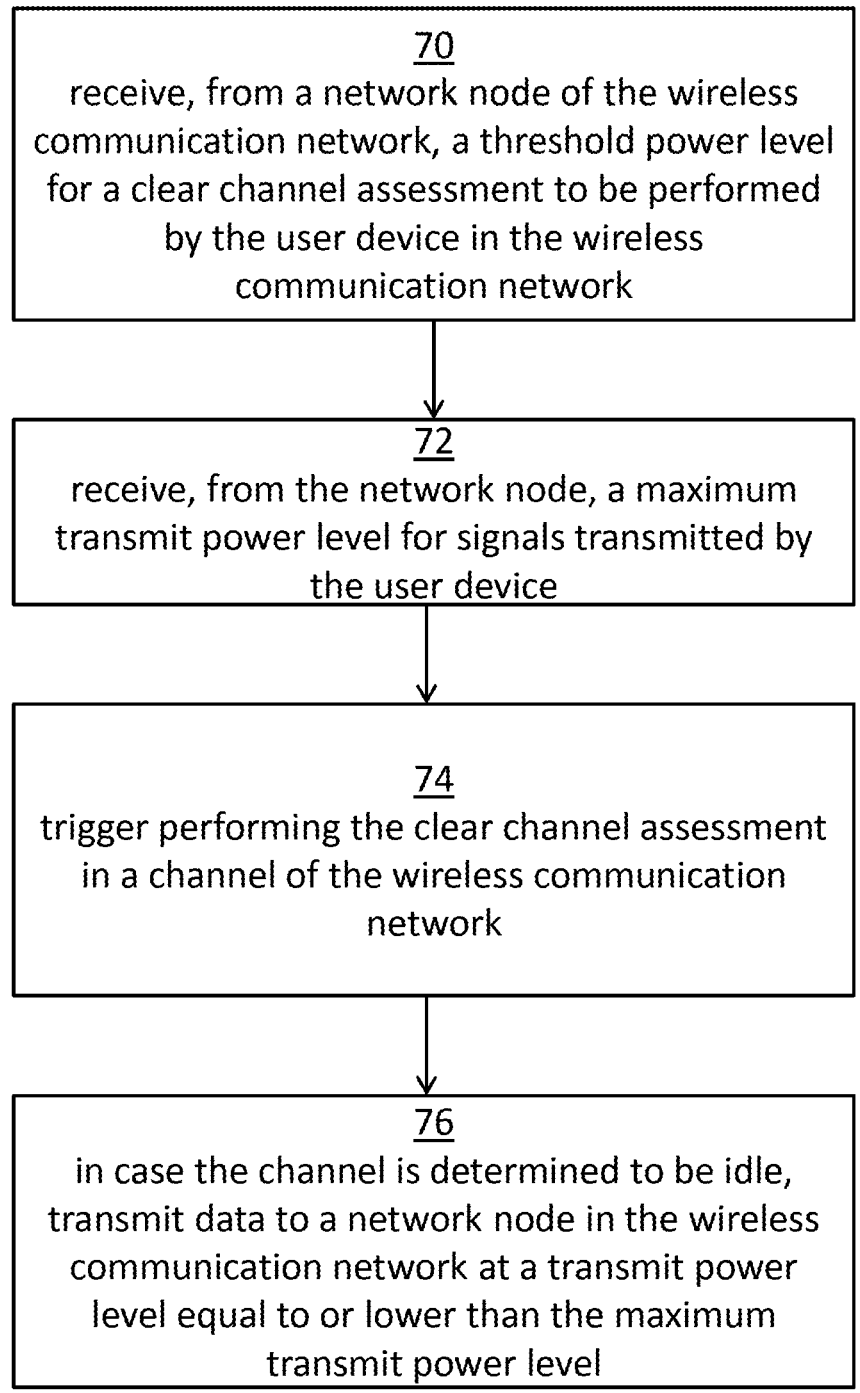
FIG. 7 shows a flowchart of a method for performing communication in a wireless communication network performed by a user device, according to the present disclosure.

FIG. 7 shows a flowchart of a method for performing communication in a wireless communication network. The method may be implemented by any of the stations (STAs) described in this disclosure and, in particular, by any of the NB-STAs described in this disclosure. In particular, the method shown in FIG. 7 may be performed by the NB-STA 13 shown in FIG. 2 or 3.

As shown in FIG. 7, the method comprises the following steps:

Receiving 70, from a network node of the wireless communication network, a threshold power level for a clear channel assessment to be performed by the user device in the wireless communication network;

Receiving 72, from the network node, a maximum transmit power level for signals transmitted by the user device;

Triggering 74 performing the clear channel assessment in a channel of the wireless communication network; and In case the channel is determined to be idle, transmitting 76 data to the network node in the wireless communication network at a transmit power level equal to or lower than the maximum transmit power level.

Figure 8:
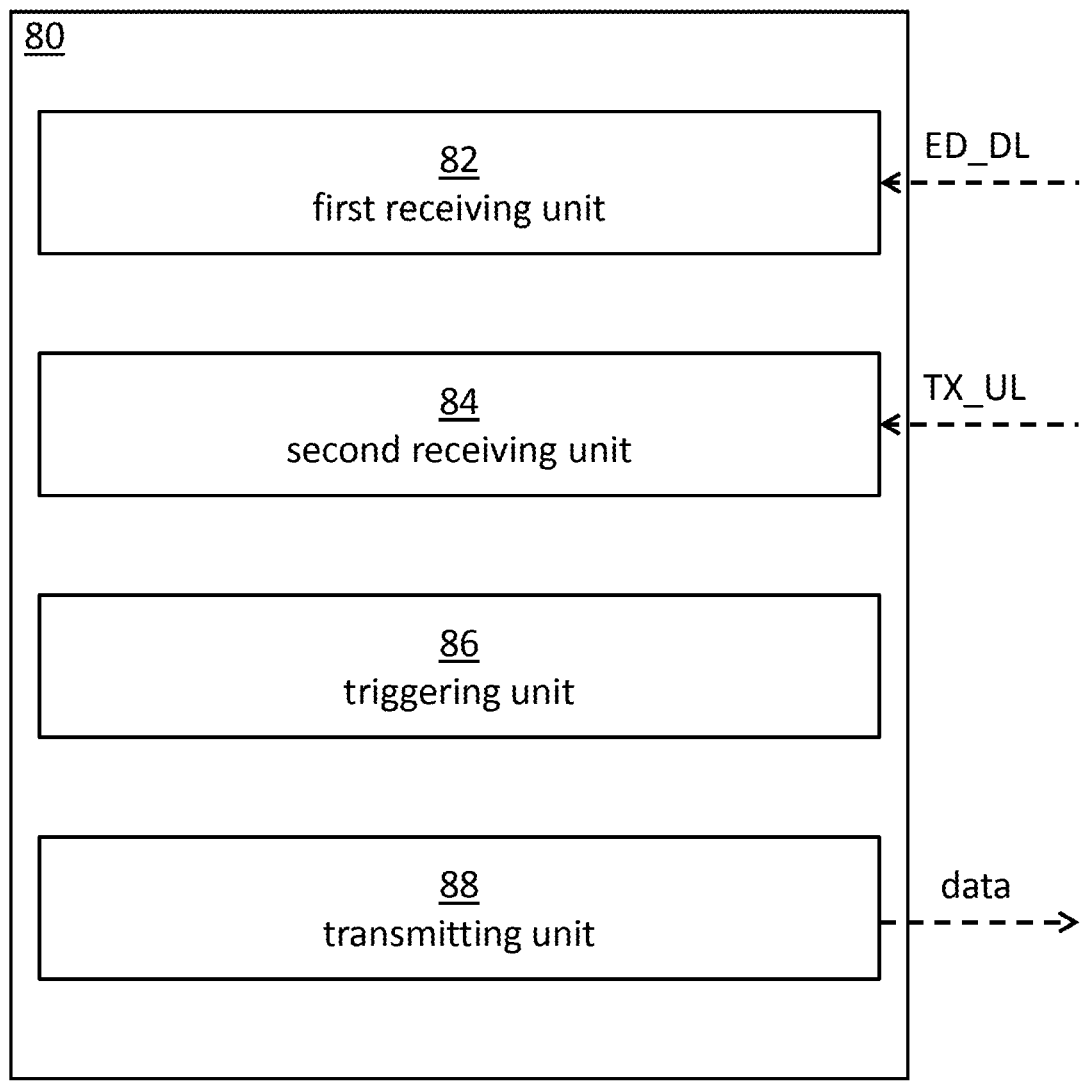
FIG. 8 shows a schematic representation of a user device for performing communication in a wireless communication network, according to the present disclosure.

FIG. 8 shows a schematic block diagram of a user device 80 configured to perform the method described above with reference to FIG. 7. The user device 80 may be a NB-STA described in the present disclosure. For example, the user device 80 may correspond to the NB-STA 13 described with regard to FIG. 2 or 3.

As shown in FIG. 8, the user device 80 comprises:

A first receiving unit 82 configured to receive, from a network node of the wireless communication network, a threshold power level for a clear channel assessment to be performed by the user device in the wireless communication network.

A second receiving unit 84 configured to receive, from the network node, a maximum transmit power level for signals transmitted by the user device.

A triggering unit 86 configured to trigger performing the clear channel assessment in a channel of the wireless communication network.

Figure 9:
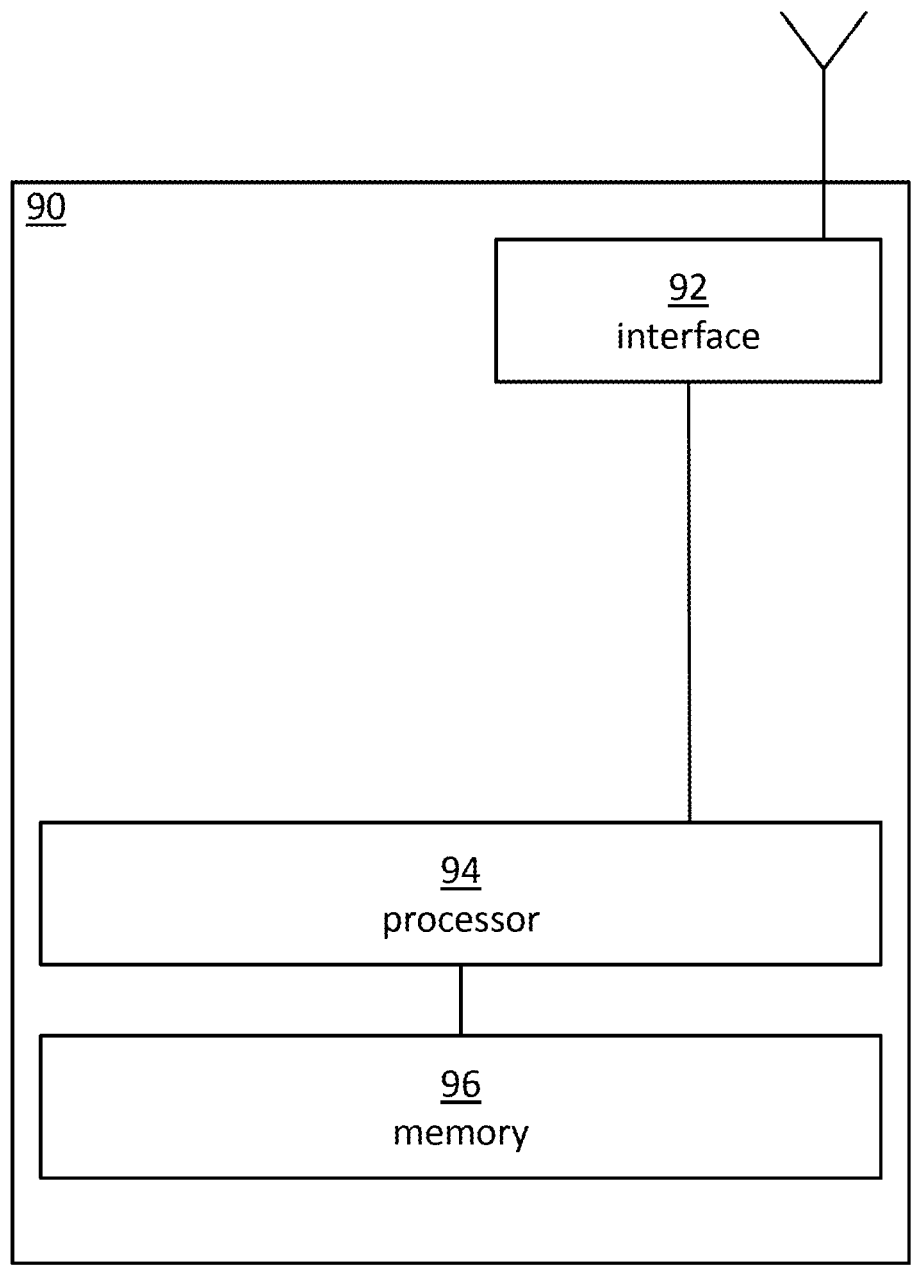
FIG. 9 shows a schematic representation of a device for performing communication in a wireless communication network, according to the present disclosure, wherein the device may be a network node or a user device.

A transmitting unit 88 configured to, in case the channel is determined to be idle, transmit data to the network node in the wireless communication network at a transmit power level equal to or lower than the maximum transmit power level FIG. 9 shows a device 90 for performing communication in a wireless communication network, according to the present disclosure. The device 90 may be configured to carry out any of the methods described herein. For example, the device 90 may be configured to perform the method shown in FIG. 5 or FIG. 7. The device 90 may be or may comprise a network node according to the present disclosure or a user device according to the present disclosure.

The device 90 comprises a network interface 92 that is adapted to communicatively couple the device 90 to the wireless communication network (e.g., the WLAN). The device 90 further comprises a processor 94 and a memory 96 containing instructions executable by the processor 94 to cause the device 90 to carry out any of the methods described in this disclosure. In particular, the memory 96 may contain instructions executable by the processor 94 to cause the device 90 to carry out any of the methods according to FIG. 5 and FIG. 7.

As has become apparent from the above description, the technique according to the present disclosure, according to some embodiments, provides a means for devices not capable of using preamble detect (PD) to employ energy detect (ED) in a way ensuring that the devices will not harm legacy operation—something that otherwise is almost unavoidable. Narrowband devices cannot perform PD as the legacy preamble is a wideband signal. In adjusting the narrowband devices' ED threshold they are enabled to coexist with wideband systems. Thus the present disclosure allows for a narrowband Wi-Fi station (NB-Wi-Fi STA) to perform ED in order to send a packet to an access point (AP) without first being scheduled by the AP.

Many advantages of the present disclosure will be fully understood from the foregoing description, and it will be apparent that various changes may be made in the form, construction and arrangement of the units and devices without departing from the scope of the present disclosure and/or without sacrificing all of its advantages. Since the embodiments can be varied in many ways, it will be recognized that the present disclosure should be limited only by the scope of the following embodiments.

What is claimed is:

1. A network node for performing communication in a wireless communication network, the network node comprising:
   a receiver configured to receive a signal transmitted by a user device in the wireless communication network and measure a received power level (P_received) at which the signal is received by the network node; and
   processing circuitry configured to:
      determine, based on a predefined transmit power level of the network node (P_transmit_NN), based on a predefined transmit power level of the user device (P_transmit_UD), and based on the received power level (P_received), a threshold power level (P_threshold) for a clear channel assessment to be performed by the user device, according to the following equation:

$P\_threshold = P\_transmit\_NN / (P\_transmit\_UD / P\_received)$; and trigger transmitting, via a transmitter of the network node, an indication of the threshold power level to the user device.

2. The network node of claim 1, the processing circuitry further being configured to:
   set a desired maximum received power level for signals to be received by the network node from the user device;
   determine, based on the maximum received power level and based on a determined path loss between the user device and the network node, a maximum transmit power level for signals transmitted by the user device; and
   trigger transmitting an indication of the maximum transmit power level to the user device.

3. The network node of claim 2, wherein the processing circuitry is configured to set the desired maximum received power level for signals to be received by the network node from the user device so as to correspond to a predefined proportion of a thermal noise power level of signals received by the network node.

4. The network node of claim 1, the processing circuitry further being configured to:
   determine radio resources used by the user device for transmitting the signal received by the network node, or for transmitting a further signal received by the network node; and
   exclude the determined radio resources from use by the network node for transmitting to one or more further user devices;
   wherein the determined radio resources are among a plurality of radio resources defined by an Orthogonal Frequency-Division Multiple Access (OFDMA) modulation scheme used by the network node.

5. The network node of claim 1, the processing circuitry further being configured to:
   determine radio resources used by the user device for transmitting the signal received by the network node, or for transmitting a further signal received by the network node; and
   exclude the determined radio resources from use by a further user device for transmitting to the network node, based on triggering transmission of a scheduling message to the further user device that indicates one or more radio resources for use by the further device, from among a list of radio resources that excludes the determined resources;
   wherein the determined radio resources and the list of radio resources are among a plurality of radio resources defined by an Orthogonal Frequency-Division Multiple Access (OFDMA) modulation scheme used by the network node.

6. The network node of claim 1, wherein the wireless communication network is a wireless local area network (WLAN) operating in the IEEE 802.11 standard family, wherein the network node comprises an access point of the WLAN and the user device comprises a station (STA) of the WLAN.

7. The network node of claim 1, wherein the user device is a first type of user device that supports a first bandwidth for communicating with the network node, and wherein the network node is configured to communicate with the first type of user device and with a second type of user device that supports a wider second bandwidth for communicating with the network node.

8. The network node of claim 7, wherein the first bandwidth is 2 MHz or less and the second bandwidth is 10 MHz or more.

9. A user device for performing communication in a wireless communication network, the user device comprising:
   a receiver configured to receive, from a network node of the wireless communication network, an indication of a maximum transmit power level for signals transmitted by the user device, and an indication of a threshold power level to be used by the user device for a clear channel assessment to be performed by the user device in the wireless communication network; and
   processing circuitry configured to trigger performing the clear channel assessment for a channel of the wireless communication network, by using the received threshold power level; and
   in case the channel is determined to be idle, transmit data to the network node in the wireless communication network at a transmit power level equal to or lower than the maximum transmit power level.

10. The user device of claim 9, wherein the wireless communication network is a wireless local area network (WLAN) operating in the IEEE 802.11 standard family and wherein the network node comprises an access point of the WLAN.

11. The user device of claim 9, wherein the wireless communication network is a wireless local area network, WLAN, operating in the IEEE 802.11 standard family and wherein the user device comprises a station (STA) of the WLAN.

12. A method for performing communication in a wireless communication network, the method being performed by a network node and comprising:
   receiving a signal transmitted by a user device in the wireless communication network;
   measuring a received power level (P_received) at which the signal is received by the network node;
   determining, based on a predefined transmit power level of the network node (P_transmit_NN), based on a predefined transmit power level of the user device, (P_transmit_UD), and based on the received power level (P_received), a threshold power level (P_threshold) for a clear channel assessment to be performed by the user device according to the following equation:

$P\_threshold = P\_transmit\_NN/(P\_transmit\_UD/P\_received)$; and triggering transmitting an indication of the threshold power level P_threshold to the user device.

13. A method for performing communication in a wireless communication network, the method being performed by a user device and comprising:
   receiving, from a network node of the wireless communication network, an indication of a maximum transmit power level for signals transmitted by the user device and an indication of a threshold power level for a clear channel assessment to be performed by the user device in the wireless communication network;
   triggering performing the clear channel assessment in a channel of the wireless communication network by using the received threshold power level; and
   in case the channel is determined to be idle, transmitting data to the network node in the wireless communication network at a transmit power level equal to or lower than the maximum transmit power level.

* * * * *

UNITED STATES PATENT AND TRADEMARK OFFICE
CERTIFICATE OF CORRECTION

PATENT NO. : 11,057,844 B2  
APPLICATION NO. : 16/718433  
DATED : July 6, 2021  
INVENTOR(S) : Wilhelmsson et al.

Page 1 of 1

It is certified that error appears in the above-identified patent and that said Letters Patent is hereby corrected as shown below:

In the Specification

In Column 1, Line 8, delete "2017." and insert -- 2017, now Pat. No. 10,548,091, --, therefor.

In Column 2, Line 60, delete "ration" and insert -- ratio --, therefor.

In Column 6, Line 41, delete "P_threshold=NN/PL," and insert -- P_threshold=P_transmit_NN/PL, --, therefor.

In Column 7, Line 60, delete "dBm)-P_offset (in dB)." and insert -- (in dBm)-P_offset (in dB). --, therefor.

In Column 12, Line 34, delete "(CSMA/CD)." and insert -- (CSMA/CA). --, therefor.

In Column 15, Line 56, delete "coding" and insert -- coding scheme --, therefor.

In Column 19, Line 14, delete "level" and insert -- level. --, therefor.

Signed and Sealed this  
First Day of March, 2022

Drew Hirshfeld  
*Performing the Functions and Duties of the*  
*Under Secretary of Commerce for Intellectual Property and*  
*Director of the United States Patent and Trademark Office*